(12) United States Patent
Avery et al.

(10) Patent No.: US 6,935,005 B2
(45) Date of Patent: Aug. 30, 2005

(54) INSTALLATION OF, A HUB/BEARING ASSEMBLY FOR AN AUTOMOTIVE VEHICLE

(75) Inventors: Michael C. Avery, North Canton, OH (US); John D. Doughtery, Canton, OH (US)

(73) Assignee: The Timken Company, Canton, OH (US)

( * ) Notice: Subject to any disclaimer, the term of this patent is extended or adjusted under 35 U.S.C. 154(b) by 0 days.

(21) Appl. No.: 10/469,877

(22) PCT Filed: Mar. 5, 2002

(86) PCT No.: PCT/US02/06807

§ 371 (c)(1),
(2), (4) Date: Sep. 5, 2003

(87) PCT Pub. No.: WO02/070285

PCT Pub. Date: Sep. 12, 2002

(65) Prior Publication Data

US 2004/0117969 A1 Jun. 24, 2004

Related U.S. Application Data

(60) Provisional application No. 60/273,748, filed on Mar. 6, 2001.

(51) Int. Cl.$^7$ ................................................ B60B 37/10
(52) U.S. Cl. .................... 29/273; 29/898.07; 301/105.1; 301/131
(58) Field of Search .................... 301/105.1, 124.1, 301/131, 132; 29/271, 273, 270, 898.07, 898.09

(56) References Cited

U.S. PATENT DOCUMENTS

| 2,046,774 | A | | 7/1936 | Oertel |
| 2,549,602 | A | | 4/1951 | Hopps |
| 2,618,189 | A | | 11/1952 | Almes |
| 3,110,095 | A | | 11/1963 | Peickii |
| 3,386,154 | A | | 6/1968 | Thill |
| 3,979,994 | A | | 9/1976 | Collignon |
| 4,005,629 | A | | 2/1977 | Franklin |
| 4,097,979 | A | | 7/1978 | Interdonato |
| 4,450,609 | A | | 5/1984 | Hamilton |
| 4,658,670 | A | | 4/1987 | Yasui et al. |
| 4,701,989 | A | | 10/1987 | Cayzer |
| 5,209,623 | A | * | 5/1993 | Krehnovi .................... 29/273 |
| 5,492,417 | A | | 2/1996 | Baker et al. |
| 5,757,084 | A | * | 5/1998 | Wagner ................... 301/105.1 |
| 5,822,859 | A | * | 10/1998 | Kessen et al. ........... 29/898.07 |

(Continued)

FOREIGN PATENT DOCUMENTS

| EP | 0936086 A2 | 8/1999 |
| EP | 1125765 A2 | 8/2001 |
| GB | 2191267 A | 5/1986 |
| WO | WO9858762 | 12/1998 |

*Primary Examiner*—Russell D. Stormer
*Assistant Examiner*—Jason R. Bellinger
(74) *Attorney, Agent, or Firm*—Polster, Lieder, Woodruff & Lucchesi, L.C.

(57) ABSTRACT

A tool facilitates the installation of a hub/bearing assembly on a CV joint during the assembly of an automotive vehicle. The hub/bearing assembly has a housing, a hub provided with a spindle that projects into the housing, and a bearing between the spindle and housing to enable the hub to rotate in the housing. The spindle contains an internal spline which mates with an external spline located on a half-shaft of the CV joint, when the hub/bearing assembly is fitted to the CV joint, but the universal movement of the CV joint makes fitting difficult in the absence of the tool. The tool has a sleeve which fits into the spline of the hub spindle and over a reduced end that projects beyond the spline on the half-shaft. It aligns the two splines so that the hub is simply pushed off the sleeve and over the spline of the half-shaft.

11 Claims, 3 Drawing Sheets

U.S. PATENT DOCUMENTS

| | | | |
|---|---|---|---|
| 5,875,550 A | * 3/1999 | Kohn | 29/898.07 |
| 5,884,980 A | * 3/1999 | Visser et al. | 301/6.1 |
| 5,997,103 A | * 12/1999 | Wagner | 301/105.1 |
| 6,099,167 A | * 8/2000 | Goto et al. | 301/105.1 |
| 6,296,321 B1 | * 10/2001 | Mizukoshi et al. | 301/105.1 |
| 6,464,399 B1 | * 10/2002 | Novak et al. | 301/105.1 |
| 6,485,188 B1 | * 11/2002 | Dougherty | 301/105.1 |
| 6,523,909 B1 | * 2/2003 | Nakamura et al. | 301/105.1 |
| 6,637,943 B2 | * 10/2003 | Novak et al. | 301/105.1 |
| 6,672,679 B2 | * 1/2004 | Kaneko | 301/105.1 |

* cited by examiner

US 6,935,005 B2

INSTALLATION OF, A HUB/BEARING ASSEMBLY FOR AN AUTOMOTIVE VEHICLE

RELATED APPLICATIONS

This application derives priority from International Application PCT/US02/06807, filed Mar. 5, 2002, and published under International Publication No. WO 02/070285 A1, and from U.S. Provisional Application 60/273,748, filed Mar. 6, 2001.

TECHNICAL FIELD

This invention relates in general to the assembly of automotive vehicles and, more particularly, to the installation of a hub/bearing assembly on an end shaft with splines on the hub/bearing assembly and end shaft engaged.

BACKGROUND ART

The manufacturers of automotive vehicles rely more and more on packaged components for the vehicles that they assemble. Whereas before, certain parts were installed separately along an assembly line, now many of these same parts are incorporated into components which are assembled elsewhere and installed on vehicles in considerably less time and with greater ease than were the individual parts. The hub assemblies by which the road wheels of a vehicle are attached to the suspension system of the vehicle provide a good example.

Not long ago, automotive manufacturers, when assembling a vehicle, would install a spindle as part of the front suspension system of a vehicle, then place an inboard bearing, a hub and an outboard bearing in that order around the spindle, followed by a nut threaded over the spindle and tightened against the outboard bearing just enough to give the two bearings the correct setting. Now a parts supplier furnishes a hub fitted to a housing with bearings located between the two and adjusted to the proper setting, that is to say, the parts supplier provides a preassembled hub/bearing assembly. The automotive manufacturer bolts the housing of the hub/bearing assembly to a suspension system component, and later attaches a brake disk and wheel to the hub.

Drive shafts complicate the procedure, and many vehicles have transverse shafts coupled to their front wheels, whether they be front wheel drive vehicles or four wheel drive vehicles. In this regard, the typical transverse shaft leads out to a constant velocity (CV) joint having an enlarged body or shell and a half-shaft projecting outwardly from the shell where it has a spline followed by a reduced end that is threaded. The spline mates with a corresponding spline in the hub of the hub/bearing assembly, while the thread on the reduced end is engaged with a nut that attaches the CV joint to the hub.

But the CV joint together with the transverse shaft to which it is coupled are quite heavy, weighing up to 50 lbs., and the hub/bearing assembly is heavy as well, making it difficult for an assembly line worker to manipulate and align the spline of the hub with the spline on the half-shaft. To be sure, the threaded end of the half-shaft fits easily into the larger splined bore of the hub, but does not align the two splines. The differences in diameter between the threaded end and the spline on the half-shaft together with the multiple degrees of freedom accorded to the half-shaft by the CV joint make it difficult and time consuming to bring the spline on the half-shaft into axial alignment with the spline in the hub—and, of course, the two splines cannot be engaged until they are so aligned.

SUMMARY OF THE INVENTION

The present invention resides in the combination of a tool, a hub/bearing assembly having a splined hub into which the tool fits, and an half-shaft having an external spline and a reduced end over which the tool fits. The tool places the two splines in axial alignment so that the hub/bearing assembly may be advanced over the half-shaft with the splines engaged. The tool is then withdrawn from the half-shaft. The invention also resides in the process of installing the hub/bearing assembly on the end shaft using the tool to align the splines.

BRIEF DESCRIPTION OF DRAWINGS

Corresponding reference characters indicate corresponding parts throughout the several views of the drawings.

BEST MODE FOR CARRYING OUT THE INVENTION

Figure 1:
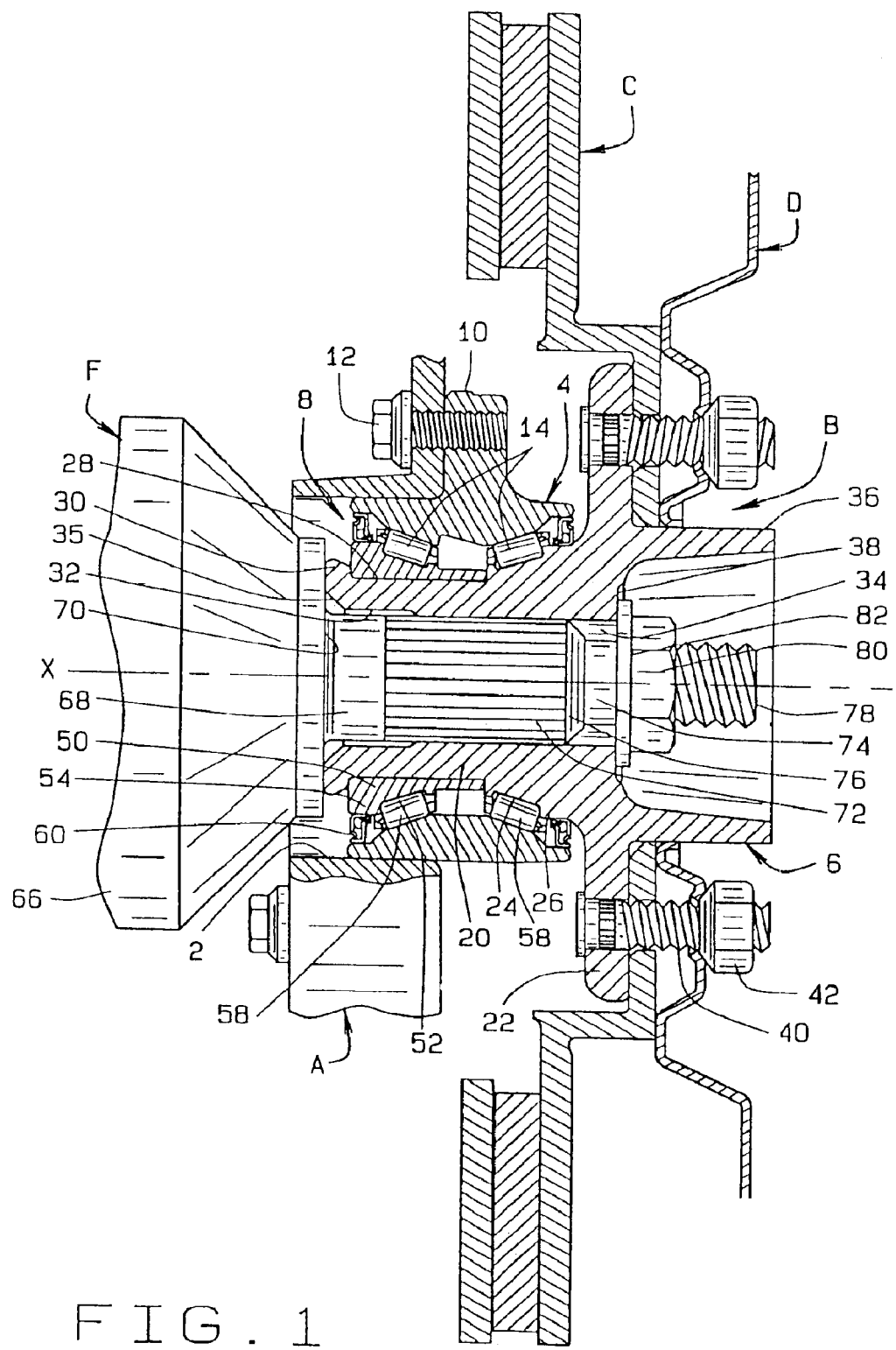
FIG. 1 is a longitudinal view showing a hub/bearing assembly and a splined half-shaft engaged with the hub of the hub/bearing assembly.
Figure 2:
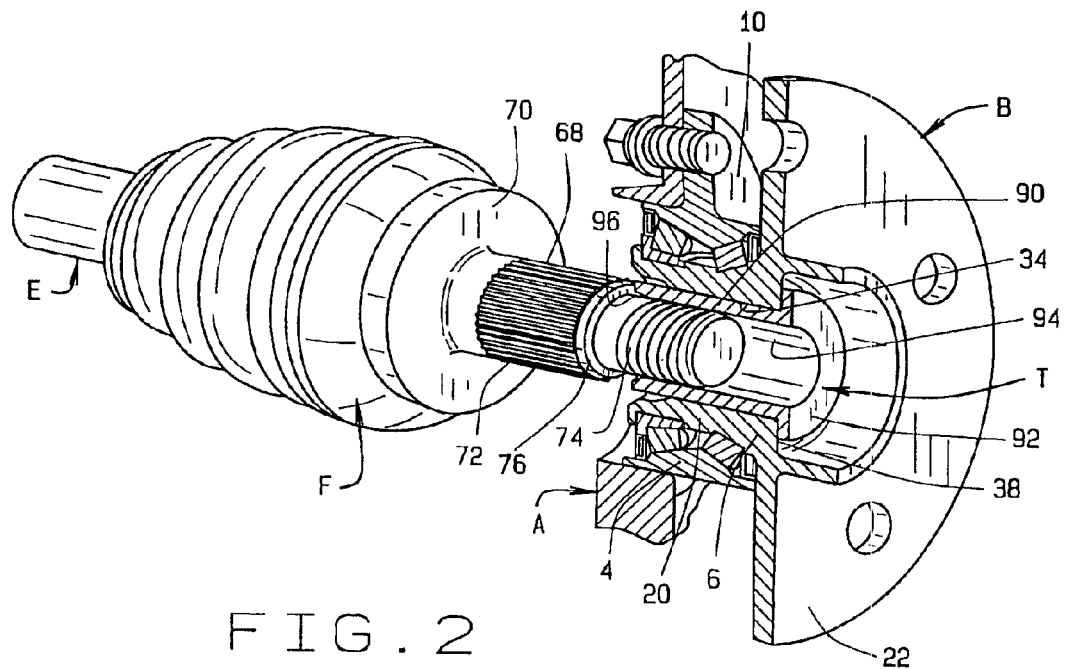
FIG. 2 is perspective view of the half-shaft and the hub of the hub/bearing assembly maintained in axial alignment with the tool of the present invention.
Figure 3:
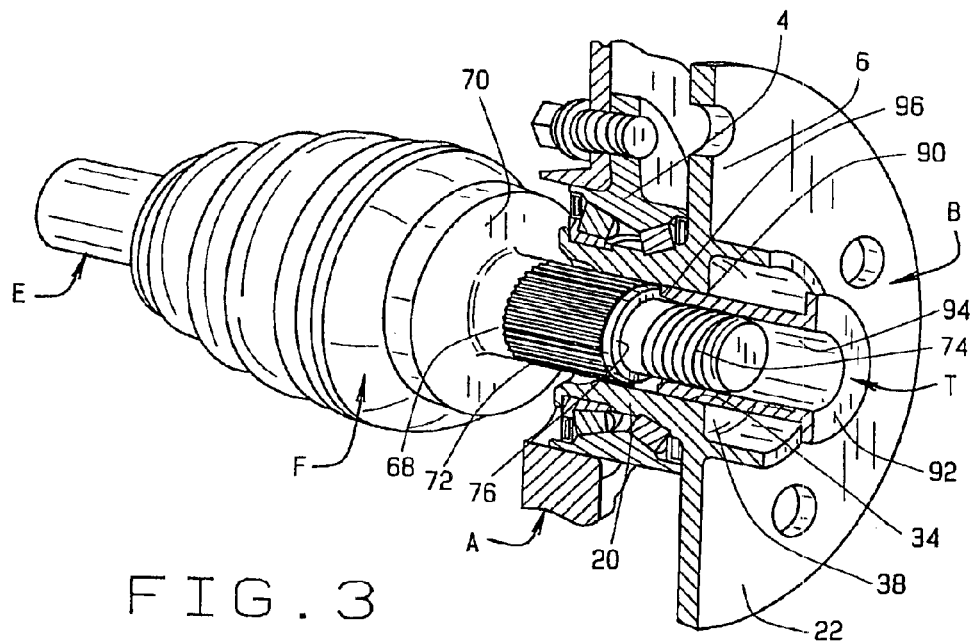
FIG. 3 is a perspective view of the hub/bearing assembly as its hub is moved off the tool and onto the aligned spline of the half-shaft.
Figure 4:
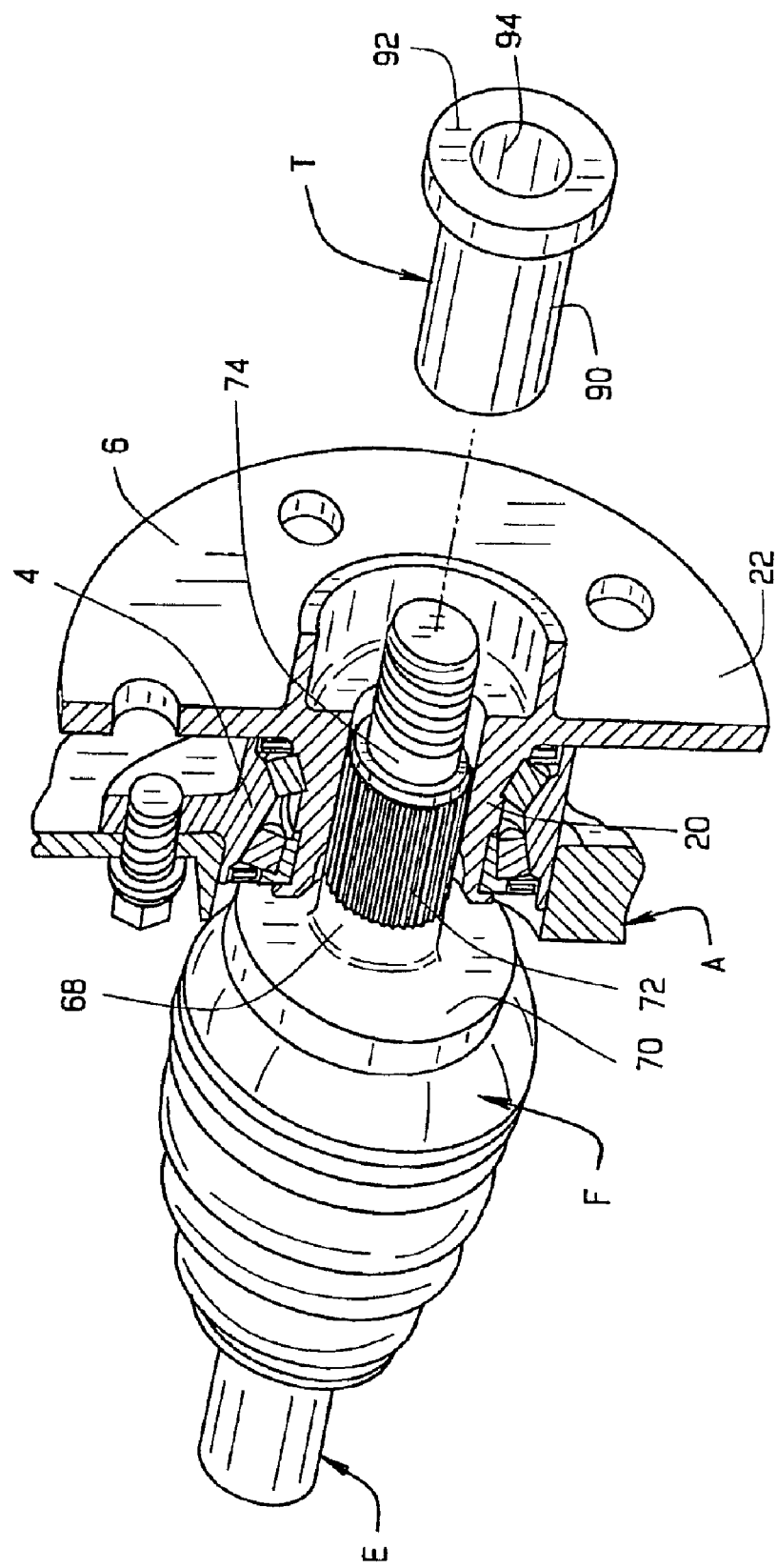
FIG. 4 is a perspective view of the hub/bearing assembly in its final position on the half-shaft and the tool withdrawn from it and from the half-shaft.

Referring now to the drawings (FIG. 1), an automotive vehicle has a suspension system component A, which may be a steering knuckle, to which a hub/bearing assembly B is attached. Actually, the suspension system component A has a circular opening 2, whereas the hub/bearing assembly B includes a housing 4 which fits into the opening 2 of the suspension system component A to which it is bolted. The hub/bearing assembly B also includes a hub 6 which is located in and beyond the housing 4 and a bearing 8 that is located between housing 4 and the hub 6 to enable the hub 6 to rotate in the housing 4 about an axis X. The hub 6 has a brake disk C and a road wheel D attached to it. Thus, the hub/bearing assembly B couples the road wheel D to the suspension system component A such that the wheel D rotates relative to the component A about the axis X. The hub 6 of the hub/bearing assembly B is driven by a transverse shaft E which is coupled to it through a universal joint such as a constant velocity (CV) joint F. During the assembly of the vehicle, the hub/bearing assembly B is fitted to the CV joint F with the aid of an alignment tool T (FIGS. 2–4).

Considering the hub/bearing assembly B in more detail (FIG. 1), its housing 4 possesses a generally cylindrical configuration, but has a multilobed flange 10, such as a triangular or rectangular flange, located intermediate its ends. The portion of the housing 4 on the inboard side of the flange 10 fits into the circular opening 2 in the suspension system component A, bringing the back face of the flange 10 against the suspension system component A. The housing 4 is attached to the suspension system component A with bolts 12 which pass through the latter from its back face and thread into the former. Internally, the housing 4 has two tapered raceways 14 which are presented inwardly toward the axis X. The raceways 14 taper downwardly toward the mid-region of the housing 4 and form part of the bearing 8.

The hub 6 has a spindle 20 which fits into the housing 4 and a hub flange 22 which is attached to the spindle 20 beyond the outboard end of the housing 4. Externally, the spindle 20 has a tapered raceway 24 that leads up to a rib 26 located immediately inboard from the hub flange 22. The raceway 24 faces outwardly toward the outboard of the two raceways 14 in the housing 4 and is inclined in the same direction. Like the raceway 14, the raceway 24 forms part of the bearing 8. At the opposite end of the raceway 24, the spindle 20 has a cylindrical bearing seat 28 and a formed end 30 to which the seat 28 leads. Internally, the spindle 20 has a smooth bore 32 which leads up to an internal spline 34 of lesser diameter. The bore 32 opens out of the formed end 30 at a beveled surface 35, whereas the spline 34 extends through the spindle 20 and into the hub flange 22 out of which it opens.

The hub flange 22 has a wheel pilot 36 which projects from its outboard face and a flat seat 38 which surrounds the end of the spline 34 within the confines of the wheel pilot 36, Both the hub flange 22 and the flat seat 38 lie perpendicular to the axis X. Finally, the hub flange 22 carries lug bolts 40 over which lug nuts 42 are threaded to secure the brake disk C and wheel D to the hub 6.

In addition to the two raceways 14 in the housing 4 and the raceway 24 on the spindle 20 of the hub 6, the bearing 8 includes a separate inner race in the form of a cone 50 that fits over the bearing seat 28 with an interference fit and has a tapered raceway 52 that is presented outwardly toward the inboard raceway 14 in the housing 4, yet tapers downwardly in the same direction as that raceway 14. The cone 50 also has a thrust rib 54 located at the large end of its raceway 52.

The bearing 8 also includes rolling elements in the form of tapered rollers 58 which are organized into two rows, one an outboard row between the outboard raceway 14 in the housing 4 and the raceway 24 on the spindle 20, and the other an inboard row between the inboard raceway 14 in the housing 4 and the raceway 52 on the cone 50. The tapered OD of the rollers 58 in the outboard row contact the raceways 14 and 24 between which they are located, whereas the large end faces of those rollers 58 are against the rib 26. Indeed, the rib 26 prevents the rollers 58 of the outboard row from being expelled from the space between the raceways 14 and 24. The tapered OD of the rollers 58 in the inboard row contact the inboard raceway 14 of the housing 4 and the raceway 52 of the cone 50, whereas their large end faces bear against the thrust rib 54 the cone 50. The thrust rib 54 prevents the rollers 58 of the inboard row from being expelled. Finally, the bearing 8 includes a cage 60 for each row of rollers 58 to maintain the proper spacing between the rollers 58 in each row.

The rollers 58 in each row are in apex, meaning the conical envelopes defined by the tapered OD of the rollers 58 in each row have their apexes at a common point along the axis X. Moreover, the bearing 8 is set to a condition of slight pre-load, so that no internal clearances exist within it, and no free motion, either axially or radially, occurs between the hub 6 and housing 4.

The formed end 30 turns outwardly behind the cone 50 and retains it on the spindle 20. Initially, the spindle 20 at its inboard end is straight to enable the cone 50 to fit over it, but once the outboard row of rollers 58 is in place along with the housing 4 and the cone 50 along with the inboard row of rollers 58 are fitted over the bearing seat 28, the straight end of the spindle 20 is turned outwardly. PCT application GB 98/01823 (International Publication No. WO 98/58762) discloses a rotary forming process for upsetting the initially extended end of the spindle 20 and converting that end into the integral formed end 30.

The transverse shaft E is coupled to the CV joint F which in turn is coupled to the hub 6 of the hub/bearing assembly B. The CV joint F enables torque that is applied to the shaft E to be transferred to the hub 6 and the wheel D even though the axis of the shaft E may not align with the axis X of the hub 6. The CV joint F includes a shell or body 66 and an end shaft, more commonly referred to as a half-shaft 68, which projects from the body 66 at a shoulder 70. The half-shaft 68 has an external spline 72 which leads away from the shoulder 70 and is configured to mate with the internal spline 34 of the spindle 20. The half-shaft 68 also has a reduced end 74 which leads away from the spline 72 at a lesser diameter, thus providing a shoulder 76 on the shaft 68. The reduced end 74 is provided with threads 78. The half-shaft 68 projects through the bore 32 and spline 34 of the hub 6, with its external spline 72 engaged with the internal spline 34 of the hub 6. The formed end 30 on the hub 6 bears against the shoulder 70 on the body 66 of the CV joint F, whereas the reduced end 74 of the half-shaft 68 projects out of the spline 34 and beyond the flat seat 38 on the hub 6. Indeed, the threads 78 are exposed at the flat seat 38 that is within the wheel pilot 36 on the hub flange 22. The CV joint F is secured firmly to the hub 6 of the hub/bearing assembly B with a nut 80 that engages the threads 78 on the reduced end 74 of the half-shaft 68 and bears against a washer 82 that in turn bears against the flat seat 38 on the hub 6. In effect, the hub 6 is captured between the shoulder 70 and the nut 80.

An automotive vehicle, while undergoing assembly, advances along an assembly line with its transverse shaft E extending laterally from a differential or transaxle and the CV joint F coupled to the end of the shaft E. Moreover, the suspension system component A, which is usually a steering knuckle, is connected to a lower control arm (not shown) so that it can swing upwardly to a generally upright position on the control arm. The hub/bearing assembly B is attached to the suspension system component A, the back portion of its cylindrical housing 4 being received in the circular opening 2 in the component A and its flange 10 being secured firmly against the component A with the bolts 12 which pass through the component A from its backside and thread into the lobes of the flange 10. In this condition the vehicle approaches the station at which the hub 6 of the hub/bearing assembly B is fitted to the half-shaft 68 of the CV joint F.

Heretofore, the assembly line worker had to, with one hand, lift the CV joint and the transverse shaft E to which it is attached and, with the other hand, lift the united suspension system component A and hub/bearing assembly B, and then manipulate them in an effort to insert the spline 72 on the half-shaft 68 of the CV joint F into the spline 34 in the spindle 20 of the hub 6 for the hub/bearing assembly B. While in this procedure the end portion 74 of the half-shaft 68 fits easily into the bore 32 that leads up to the spline 34 in the hub 6, the two splines 34 and 72 rarely align. The half-shaft 68, owing to the universal movement accorded by the CV joint F, can assume numerous angular orientations. This makes it difficult to align the two splines 34 and 72 and fit the hub 6 over the half-shaft 68.

The alignment tool T enables the hub/bearing assembly B to be fitted to the CV joint F with substantially less effort and in considerably less time. The tool T includes (FIGS. 2–3) a cylindrical sleeve 90 and a flange 92 at one end of the sleeve 90. Through both passes a cylindrical bore 94 which opens out of the end remote from the flange 92 at a chamfer 96. The external diameter of the sleeve 90 is designed to have slight clearance when inserted into the minor diameter of the internal spline 34 in the hub 6. At this diameter, the sleeve 90 will slide easily into the spline 34 of the hub 6, until the flange 92 on the tool T comes against the seat 38 at the outboard end of the spline 34 (FIG. 2). When the tool T is so positioned, the opposite end of its sleeve 90 lies within the formed end of 30 of the spindle 20 for the hub 6. The diameter of the bore 94 is slightly larger than the diameter of the reduced end 74 on the half-shaft 68, which is enough to enable the sleeve 90 to slide easily over the reduced end 74 of the half-shaft 68 on the CV joint F. The tool T is preferably made from a durable material, yet a material that is not as hard as the steel of the CV joint F and the hub 6, so that it will not mar the threads 78 on the half-shaft 68 or the spline 34 in the hub 6. A rigid polymer or aluminum will suffice.

The assembly line worker responsible for installation of the hub/bearing assembly B on the CV joint F fits the tool T into the hub 6 of the hub/bearing assembly B, inserting the sleeve 90 of the tool T into the spline 34 of the hub 6 from the outboard end and advancing the sleeve 90 through the spline 34 and into the enlarged bore 32 until the flange 92 on the tool T comes against the flat seat 38 (FIG. 2). With the tool T so disposed, the chamfer 96 at the opposite end of the sleeve 90 lies within the formed end 30 at the inboard end of the hub spindle 20. As the vehicle on the assembly line approaches with the half-shaft 68 of its CV joint F projecting generally laterally and the housing 4 of the hub/bearing assembly B attached to the suspension system component A, the assembly line worker grasps the CV joint F with one hand and the bearing assembly B with the other and inserts the reduced end 74 on the half-shaft 68 of the CV-joint F into the bore 94 in the sleeve 90 of the tool T, which in turn, is in the hub 6 of the hub/bearing assembly B. The chamfer 96 at the end of the bore 94 guides the reduced end 74 into the sleeve 90 with only minimal manipulation. The sleeve 90 is advanced over the reduced end 74, indeed, until its chamfered end bears against the shoulder 76 at the end of the external spline 72 on the half-shaft 68 (FIG. 2). This brings the spline 72 on the half-shaft 68 and the spline 34 in the spindle 20 of the hub 6 into axial alignment. Thereupon, the bearing assembly B is rotated on bearing 8 until the two splines 34 and 72 will mate, whereupon the hub/bearing assembly B is advanced onto the half shaft 68 of the CV joint F (FIG. 3). The internal spline 34 in the hub 6 passes over the external spline 72 on the half-shaft 68 until the formed end 30 on the spindle 20 of the hub 6 approaches the shoulder 70 on the body 66 of the CV joint F. As the hub 6 slides over the spline 72 on the half-shaft 68, the sleeve 90 of the tool T remains on the reduced end 74 of the half-shaft 68, inasmuch as the chamfered end 96 of the sleeve 90 bears against the shoulder 76 between the reduced end 74 and spline 72. Thus, the spline 34 of the hub 6 slides off the sleeve 90, leaving the flange 92 exposed where it may be easily grasped (FIG. 3). When the formed end 30 on the spindle 20 of the hub 6 reaches the shoulder 70 on the CV joint F, the worker grasps the tool T and withdraws it from the hub 6, setting it aside for use installing another hub/bearing assembly B (FIG. 4).

At this juncture, the worker places the washer 82 over the exposed portion of the reduced end 74 and then engages the threads 78 with the nut 80. The worker tightens the nut 80 down tightly against the washer 82, so that the hub 6 is captured firmly between the shoulder 70 of the CV joint F and the nut 80 (FIG. 1).

Variations are, of course, possible. Perhaps the broadest variation is that the invention is equally effective for other traditional drive systems, such as traditional universal joint applications. For example, the cone 50 may be retained with a nut or ring instead of the integrally formed end 30. The bearing 6 may have two separate cones 50 instead of one. Also the bearing 6 may have rolling elements of other configurations, for example, balls as in an angular contact ball bearing. The suspension system component A may be supported on rear wheels, in which event it need not pivot about an upright axis as does a steering knuckle.

What is claimed is:

1. In combination with an automotive vehicle that is partially assembled and includes an end shaft that has an external spline and a reduced end of lesser diameter that is located beyond the spline and extends to the end of the shaft, and that further includes a hub/bearing assembly having a housing, a hub having a spindle that projects into the housing and has an internal spline that is configured to mate with the external spline on the shaft, and a bearing located between the spindle of the hub and the housing to enable the hub to rotate; an assembly tool for facilitating installation of the hub spindle over the end shaft, said tool comprising: a sleeve located within the spline of the hub and around the reduced end portion of the end shaft and axially aligning the spline of the hub with the spline of the shaft.

2. The combination according to claim 1 and further comprising a transverse shaft on the vehicle and a universal joint connected to the transverse shaft; and wherein the end shaft forms part of the universal joint.

3. The combination according to claim 2 wherein the universal joint has a body that is wider than the end shaft, and the body has a shoulder from which the end shaft projects, and the end shaft is fixed in position with respect to the body.

4. The combination according to claim 3 and further comprising a suspension system component having an opening in which the housing of the hub/bearing assembly is received; and wherein the body of the universal joint lies generally behind the opening.

5. The combination according to claim 4 wherein the hub has a flange which is attached to one end of the spindle and the flange lies beyond the housing.

6. The combination according to claim 1 wherein the tool extends beyond the internal spline of the hub spindle and out of the hub to a location where it can be grasped.

7. The combination according to claim 1 wherein the tool has a flange at one end of the sleeve, and the flange is located beyond the spline in the hub spindle where it can be grasped.

8. A process for installing a hub/bearing assembly on partially assembled automotive vehicle that includes a transverse shaft and a universal joint coupled to the end of the transverse shaft and has a body and a half-shaft projecting from the body, the half-shaft having an external spline and a reduced end located beyond the external spline and being of a lesser diameter than the spline, the hub/bearing assembly including a housing, a hub having a spindle which is located within the housing and has an internal spline that is configured to mate with the external spline on the half-shaft, and a bearing located between the spindle and the housing to enable the hub to rotate on the housing; said process comprising: placing the hub/bearing assembly around the half-shaft of the universal joint such that end portion of half-shaft is received in the spindle of the hub, but the external and internal splines are not engaged; interposing a sleeve on an alignment tool between the interior of the hub and the reduced end of the half-shaft to axially align the external spline on the half-shaft with internal spline of the spindle; advancing the hub/bearing assembly over the half-shaft and toward the body of the universal joint, whereby the spline in the spindle and the spline on the half-shaft engage; and withdrawing the sleeve of the alignment tool from the reduced end portion of the half-shaft.

9. The process according to claim 8 wherein the housing of the hub/bearing assembly is attached to a suspension system component.

10. The process according to claim 8 wherein the tool has a flange at one end of its sleeve, and when the sleeve is interposed between the reduced end of the half-shaft and interior of the hub, the flange of the tool is located beyond the spline of the hub; and wherein the step of removing the tool includes grasping the flange of the tool and pulling the tool off the reduced end of the half-shaft.

11. The process according to claim 8 wherein the reduced end of the half-shaft has a thread, and further comprising engaging a nut with the thread on the reduced end of the half-shaft and tightening the nut against the hub of the hub/bearing assembly so that the hub is captured between the nut and the body of the universal joint.

* * * * *

UNITED STATES PATENT AND TRADEMARK OFFICE
CERTIFICATE OF CORRECTION

PATENT NO. : 6,935,005 B2
DATED : August 30, 2005
INVENTOR(S) : Michael C. Avery and John D. Dougherty It is certified that error appears in the above-identified patent and that said Letters Patent is hereby corrected as shown below:

<u>Title page,</u>
Item [54], Title, between "OF" and "A" delete the comma.
Item [75], Inventors, replace "Doughtery" with -- Dougherty --.

Signed and Sealed this

Eighth Day of November, 2005

JON W. DUDAS
*Director of the United States Patent and Trademark Office*